United States Patent
Ehlert et al.

(10) Patent No.: US 6,676,003 B2
(45) Date of Patent: *Jan. 13, 2004

(54) RIGID ISOLATION OF ROTARY ULTRASONIC HORN

(75) Inventors: Thomas David Ehlert, Neenah, WI (US); Patrick Sean McNichols, Hortonville, WI (US); Tauhid Husain, New Milford, CT (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 37 days.

This patent is subject to a terminal disclaimer.

(21) Appl. No.: 10/034,006

(22) Filed: Dec. 18, 2001

(65) Prior Publication Data
US 2003/0111513 A1 Jun. 19, 2003

(51) Int. Cl.[7] .............................. B23K 1/06; B23K 5/20; B23K 37/00
(52) U.S. Cl. ...................................... 228/1.1; 228/110.1
(58) Field of Search ............ 228/2.1, 2.3, 112.1–114.5, 228/117.1–117.5; 425/174.2; 264/442, 443, 445; 156/580.1, 580.2, 73.1, 73.2

(56) References Cited

U.S. PATENT DOCUMENTS

| | | |
|---|---|---|
| 3,955,740 A | 5/1976 | Shoh |
| 4,081,301 A | 3/1978 | Buell |
| 4,083,737 A | 4/1978 | Foote, Jr. et al. |
| 4,205,679 A | 6/1980 | Repke et al. |
| 4,226,238 A | 10/1980 | Bianco |
| 4,305,988 A | 12/1981 | Kocher |
| 4,311,540 A * | 1/1982 | Hill ........................... 156/73.1 |
| 4,333,978 A | 6/1982 | Kocher |
| 4,430,148 A | 2/1984 | Schaefer |
| 4,543,154 A | 9/1985 | Reiter |
| 4,610,681 A | 9/1986 | Strohbeen et al. |
| 4,647,336 A | 3/1987 | Coenen et al. |
| 4,692,163 A | 9/1987 | Widlund et al. |
| 4,695,278 A | 9/1987 | Lawson |
| 4,713,132 A | 12/1987 | Abel et al. |
| 4,738,677 A | 4/1988 | Foreman |
| 4,758,293 A | 7/1988 | Samida |
| 4,795,454 A | 1/1989 | Dragoo |
| 4,801,345 A | 1/1989 | Dussaud et al. |
| 4,816,025 A | 3/1989 | Foreman |

(List continued on next page.)

FOREIGN PATENT DOCUMENTS

| | | |
|---|---|---|
| AU | 716300 | 10/1997 |
| DE | 295 03 122 U1 | 6/1995 |
| DE | 298 14 704 U1 | 2/1999 |
| DE | 198 13 121 C1 | 10/1999 |
| EP | 0 004 782 A2 | 10/1979 |

(List continued on next page.)

*Primary Examiner*—Tom Dunn
*Assistant Examiner*—Colleen P. Cooke
(74) *Attorney, Agent, or Firm*—Paul Yee; John L. Brodersen

(57) ABSTRACT

A method and apparatus (20) for ultrasonic bonding or other processing can include a rotatable ultrasonic horn member (28) and a rotatable axle member (34). The axle member is operatively joined to the horn member (28), and can provide a node plane (38). An isolation member (42) can be operatively joined to the axle member (34), and may have a location that is operatively proximate the node plane (38) of the axle member (34). In a particular aspect, the isolation member (42) can exhibit high rigidity. In a further feature, the isolation member (42) is capable of bending under a horn-life range of sonic frequencies to provide an operative component of motion along a radial direction (102), and an operative component of motion along an axial direction (100) of the isolation member.

22 Claims, 11 Drawing Sheets

U.S. PATENT DOCUMENTS

| | | |
|---|---|---|
| 4,816,026 A | 3/1989 | Richardson |
| 4,863,542 A | 9/1989 | Oshefsky et al. |
| 4,938,755 A | 7/1990 | Foreman |
| 4,975,133 A * | 12/1990 | Gochermann .............. 156/73.1 |
| 4,977,011 A | 12/1990 | Smith |
| 5,021,051 A | 6/1991 | Hiuke |
| 5,032,120 A | 7/1991 | Freeland et al. |
| 5,064,489 A | 11/1991 | Ujimoto et al. |
| 5,087,320 A | 2/1992 | Neuwirth |
| 5,096,532 A | 3/1992 | Neuwirth et al. |
| 5,110,403 A | 5/1992 | Ehlert |
| 5,209,801 A | 5/1993 | Smith |
| 5,336,346 A | 8/1994 | Meltzer et al. |
| 5,393,360 A | 2/1995 | Bridges et al. |
| 5,407,438 A | 4/1995 | Hedlund et al. |
| 5,407,507 A | 4/1995 | Ball |
| 5,451,219 A | 9/1995 | Suzuki et al. |
| 5,468,320 A | 11/1995 | Zafiroglu |
| 5,496,428 A | 3/1996 | Sageser et al. |
| 5,552,013 A | 9/1996 | Ehlert et al. |
| 5,560,793 A | 10/1996 | Ruscher et al. |
| 5,562,790 A | 10/1996 | Ehlert et al. |
| 5,565,050 A | 10/1996 | Sageser et al. |
| 5,567,254 A | 10/1996 | Sageser |
| 5,590,866 A | 1/1997 | Cunningham |
| 5,591,298 A | 1/1997 | Goodman et al. |
| 5,605,026 A | 2/1997 | Schott et al. |
| 5,609,702 A | 3/1997 | Andersen |
| 5,618,366 A | 4/1997 | Suekane |
| 5,620,545 A | 4/1997 | Braun et al. |
| 5,626,574 A | 5/1997 | Sasaki et al. |
| 5,628,738 A | 5/1997 | Suekane |
| 5,643,377 A | 7/1997 | Juergens |
| 5,643,396 A | 7/1997 | Rajala et al. |
| 5,645,681 A * | 7/1997 | Gopalakrishna et al. . 156/580.2 |
| 5,660,657 A | 8/1997 | Rajala et al. |
| 5,660,679 A | 8/1997 | Rajala et al. |
| 5,662,637 A | 9/1997 | Kitaoka et al. |
| 5,667,608 A | 9/1997 | Rajala et al. |
| 5,667,609 A | 9/1997 | Liu |
| 5,672,166 A | 9/1997 | Vandemoortele |
| 5,693,177 A | 12/1997 | Meltzer et al. |
| 5,707,470 A | 1/1998 | Rajala et al. |
| 5,707,483 A | 1/1998 | Nayar et al. |
| 5,711,832 A | 1/1998 | Glaug et al. |
| 5,711,847 A | 1/1998 | Rajala et al. |
| 5,733,411 A | 3/1998 | Bett |
| 5,755,902 A | 5/1998 | Reynolds |
| 5,772,100 A * | 6/1998 | Patrikios ..................... 228/1.1 |
| 5,797,895 A | 8/1998 | Widlund et al. |
| 5,817,199 A | 10/1998 | Brennecke et al. |
| 5,827,387 A | 10/1998 | Reynolds et al. |
| 5,851,204 A | 12/1998 | Mizutani |
| 5,855,573 A | 1/1999 | Johansson |
| 5,876,392 A | 3/1999 | Hisada |
| 5,904,286 A * | 5/1999 | Kawagishi et al. .......... 228/1.1 |
| 5,931,825 A | 8/1999 | Kuen et al. |
| 5,976,316 A | 11/1999 | Mlinar et al. |
| 5,979,316 A | 11/1999 | Baum |
| 6,010,766 A | 1/2000 | Braun et al. |
| 6,017,406 A | 1/2000 | Vogt |
| 6,022,431 A | 2/2000 | Blenke et al. |
| 6,059,923 A * | 5/2000 | Gopalakrishna ......... 156/580.2 |
| 6,123,792 A | 9/2000 | Samida et al. |
| 6,190,296 B1 | 2/2001 | Gnad et al. |
| 6,287,403 B1 | 9/2001 | Couillard et al. |
| 6,336,803 B1 | 1/2002 | Funger et al. |
| 6,457,626 B1 | 10/2002 | Sheehan et al. |
| 6,463,349 B2 * | 10/2002 | White et al. ................ 700/119 |
| 2002/0062903 A1 | 5/2002 | Couillard et al. |

FOREIGN PATENT DOCUMENTS

| | | |
|---|---|---|
| EP | 0 119 827 B1 | 9/1984 |
| EP | 0 685 586 A2 | 12/1995 |
| EP | 0 689 930 A2 | 1/1996 |
| EP | 0 735 947 B1 | 10/1996 |
| EP | 0 920 977 A1 | 6/1999 |
| JP | 11-277500 A | 10/1999 |
| WO | WO 91/04724 A1 | 4/1991 |
| WO | WO 94/01070 A1 | 1/1994 |
| WO | WO 97/31603 A1 | 9/1997 |
| WO | WO 98/24389 A1 | 6/1998 |
| WO | WO 98/27906 A1 | 7/1998 |
| WO | WO 98/37842 A1 | 9/1998 |
| WO | WO 98/55292 A1 | 12/1998 |
| WO | WO 98/55298 A1 | 12/1998 |
| WO | WO 99/38666 A1 | 8/1999 |
| WO | WO 99/65436 A1 | 12/1999 |
| WO | WO 00/38609 A1 | 7/2000 |
| WO | WO 01/00053 A1 | 1/2001 |

* cited by examiner

RIGID ISOLATION OF ROTARY ULTRASONIC HORN

FIELD OF THE INVENTION

This invention generally relates to a method and apparatus that can be employed for ultrasonic processing operations. In particular features, the method and apparatus can include a rotary ultrasonic horn, and the ultrasonic processing can include an ultrasonic bonding operation. More particularly, the invention relates to an ultrasonic processing method and apparatus which can provide for an operative isolation of the rotary horn while employing a connection system that has relatively high rigidity and stiffness.

BACKGROUND OF THE INVENTION

Conventional ultrasonic systems have included a rotary horn which cooperates with a rotary anvil. The conventional rotary ultrasonic horns have been supported and mounted by employing rubber or other elastomeric components to provide ultrasonic isolation. As a result, the ultrasonic horn has exhibited low static stiffness, low dynamic stiffness, and has exhibited excessively large amounts of run-out or other displacements during ordinary operation. Additionally, the conventional ultrasonic horn systems have employed complicated and unreliable torque transmission techniques.

To help address the various shortcomings, the conventional ultrasonic bonding systems have employed additional support wheels to help maintain the ultrasonic horn in a desired position relative to the cooperating rotary anvil. Typically, the support wheels have been configured to hold the rotary horn in a substantially continuous, direct contact with the rotary anvil during ordinary operation. The use of such support wheels, however, has excessively increased the audible noise from the system, and has caused excessive wear on the working surface of the ultrasonic horn. Additionally, the horn has exhibited uneven wear, or has required the use of an oscillation mechanism to more evenly distribute the wear. Torque transmission systems needed for driving the rotary horn have been excessively costly, have required excessive maintenance, and have been difficult to setup and adjust. The conventional ultrasonic horn systems have also created areas on the working surface of the horn that have been unsuitable for performing desired bonding operations, and have not provided sufficient levels of dynamic stability. Additionally, the conventional ultrasonic bonding systems have required excessively critical adjustments, and have exhibited excessive complexity and excessive costs. Where rubber or other elastic materials are employed to provide acoustic isolation mounts, the mounts can generate excessive reflected energy if the elastomeric material is over compressed. As a result, there has been a continued need for improved ultrasonic bonding systems.

BRIEF DESCRIPTION OF THE INVENTION

An ultrasonic processing method and apparatus can include a rotatable ultrasonic horn member operatively joined to an isolation member. In a particular aspect, the isolation member can exhibit high rigidity. In a further feature, the isolation member can be configured to operatively bend under a horn-life range of sonic frequencies to provide an operative component of motion along a radial direction and an operative component of motion along an axial direction.

In a particular aspect, the isolation member can have a radial isolation component and an axial isolation component. The radial isolation component can be operatively joined to the axle member, and can be configured to extend at least radially from the axle member. The radial isolation component can be configured to operatively bend under the horn-life range of sonic frequencies. The axial isolation component can be operatively joined to an operative portion of the radial isolation component, and can be configured to extend at least axially from the radial isolation component. The axial isolation component can be configured to operatively bend under the horn-life range of sonic frequencies.

The various aspects, features and configurations of the method and apparatus of the invention can provide a distinctive, rotary ultrasonic horn system which includes a corresponding wave-guide and at least one isolation member that has high rigidity and stiffness. The isolation member can operably isolate the radial motion that can arise at the longitudinal node of a wave-guide, and can provide sufficient bandwidth to compensate for nodal shifts that can occur during ordinary operation. The isolation member can also provide improved stiffness to reduce deflections under load. The increased stiffness can help maintain concentricity, and help to reduce run-out displacements. Additionally, the isolation member can more efficiently transmit torque and can provide improved effectiveness and efficiency. The isolation member can also be configured to reduce stress concentrations and to increase fatigue resistance, and can provide for a mounting system that can reduce relative motions between component parts. The method and apparatus of the invention can reduce the need for elastomeric isolation components, and can eliminate the need for conventional elastomeric O-rings and associated isolation-ring hardware. The method and apparatus can also reduce the need for torque transmission keys, and can avoid the use of auxiliary support wheels for maintaining the desired locations of the rotary horn and rotary anvil.

BRIEF DESCRIPTION OF THE DRAWINGS

The invention will be more fully understood and further advantages will become apparent when reference is made to the following detailed description of the invention and to the drawings in which.

DETAILED DESCRIPTION OF THE INVENTION

Figure 1:
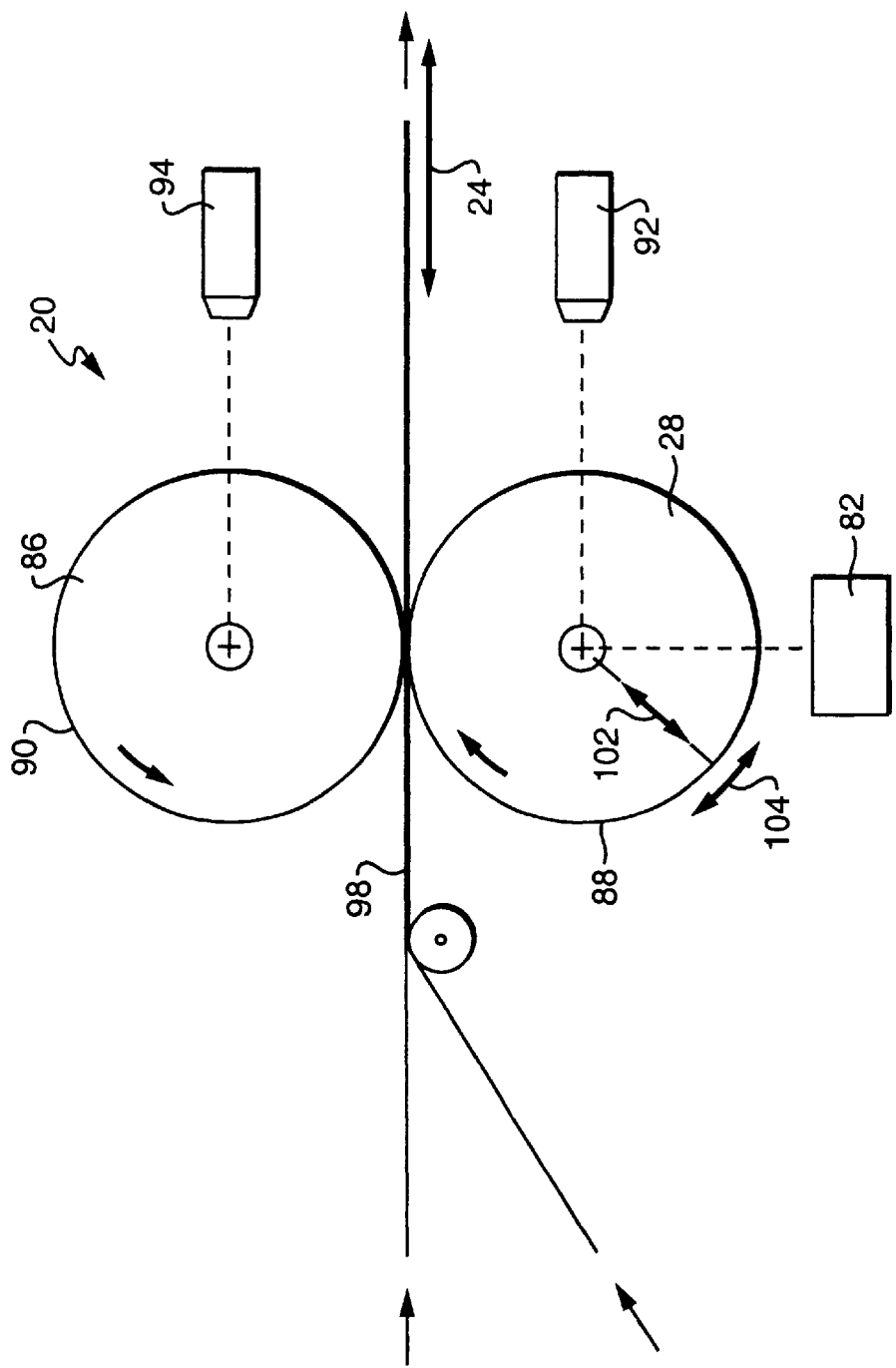
FIG. 1 shows a schematic, side view of a representative method and apparatus that may incorporate the present invention.

The method and apparatus that incorporates the present invention can be employed with any operative ultrasonic processing operation. Representative examples of such processing operations can include ultrasonic cutting, perforating, bonding, welding, embossing, crimping, heat activation or the like, as well as combinations thereof.

In the present disclosure, the terms "bonding" and "welding" may be used interchangeably, and refer to the substantially permanent joining of at least one layer of a material with another layer of a like or different material. The nature of the materials to be bonded is not known to be critical. However, the present invention is particularly useful in the bonding of two or more layers of materials, such as woven fabrics, nonwoven fabrics, and films.

The term "fabric" is used broadly in the present disclosure to mean a sheet or web of a woven or nonwoven fibrous material. The fabric or film layer may be continuous, as in a roll, or may be discontinuous.

The materials ultrasonically processed by the method and apparatus may include thermoplastic polymers or other thermoplastic materials. Alternatively, the processed materials may not include a thermoplastic material.

The representative configurations of the method and apparatus will, for example, be disclosed and described with reference to an ultrasonic bonding operation. It should be apparent that an adequate bonding or welding can be achieved by a variety of mechanisms. For example, the bond can result from the partial or complete melting in the bonding zone of all of the materials to be bonded. In this case, there is partial or complete fusion in the bonding area of such materials. Alternatively, the bond can result from the partial or complete melting of one of the materials to be bonded, with the partially or completely melted material flowing into or onto adjacent materials which in turn results in a mechanical interlocking of one material with another.

The present disclosure will be expressed in terms of its various components, elements, constructions, configurations and arrangements that may also be individually or collectively be referenced by the terms, "aspect(s)" of the invention, feature(s) of the invention, or other similar terms. It is contemplated that the various forms of the disclosed invention may incorporate one or more of its various features and aspects, and that such features and aspects may be employed in any desired, operative combination thereof.

It should also be noted that, when employed in the present disclosure, the terms "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

The technology of the invention can be configured to produce various types of desired articles. Such articles may, for example, be gowns, covers, wraps, drapes, garments, packaging or the like. The articles may also be absorbent articles, and the absorbent articles may include infant diapers, children's training pants, feminine care articles, adult incontinence garments, and the like. The articles may be disposable, and intended for limited use. Typically, the disposable articles are not intended for washing and reuse.

Figure 2:
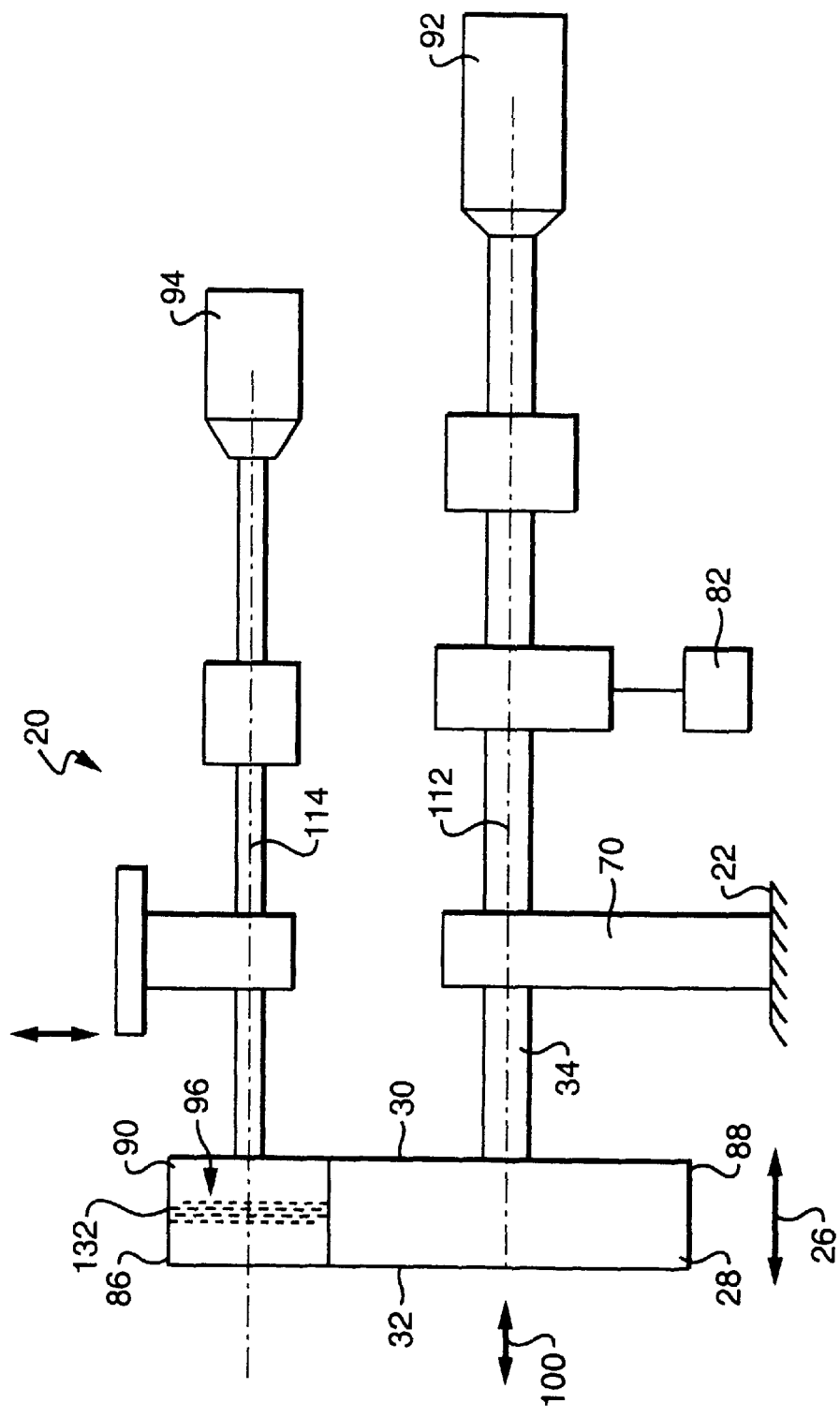
FIG. 2 shows a schematic, end view of a representative method and apparatus that may incorporate the present invention.

With reference to FIGS. 1 and 2, the process and apparatus of the invention can have a lengthwise, machine-direction 24 which extends longitudinally, a lateral cross-direction 26 which extends transversely, and a z-direction. For the purposes of the present disclosure, the machine-direction 24 is the direction along which a particular component or material is transported length-wise along and through a particular, local position of the apparatus and method. The cross-direction 26 lies generally within the plane of the material being transported through the process, and is aligned perpendicular to the local machine-direction 24. The z-direction is aligned substantially perpendicular to both the machine-direction 24 and the cross-direction 26, and extends generally along a depth-wise, thickness dimension.

Figure 5:
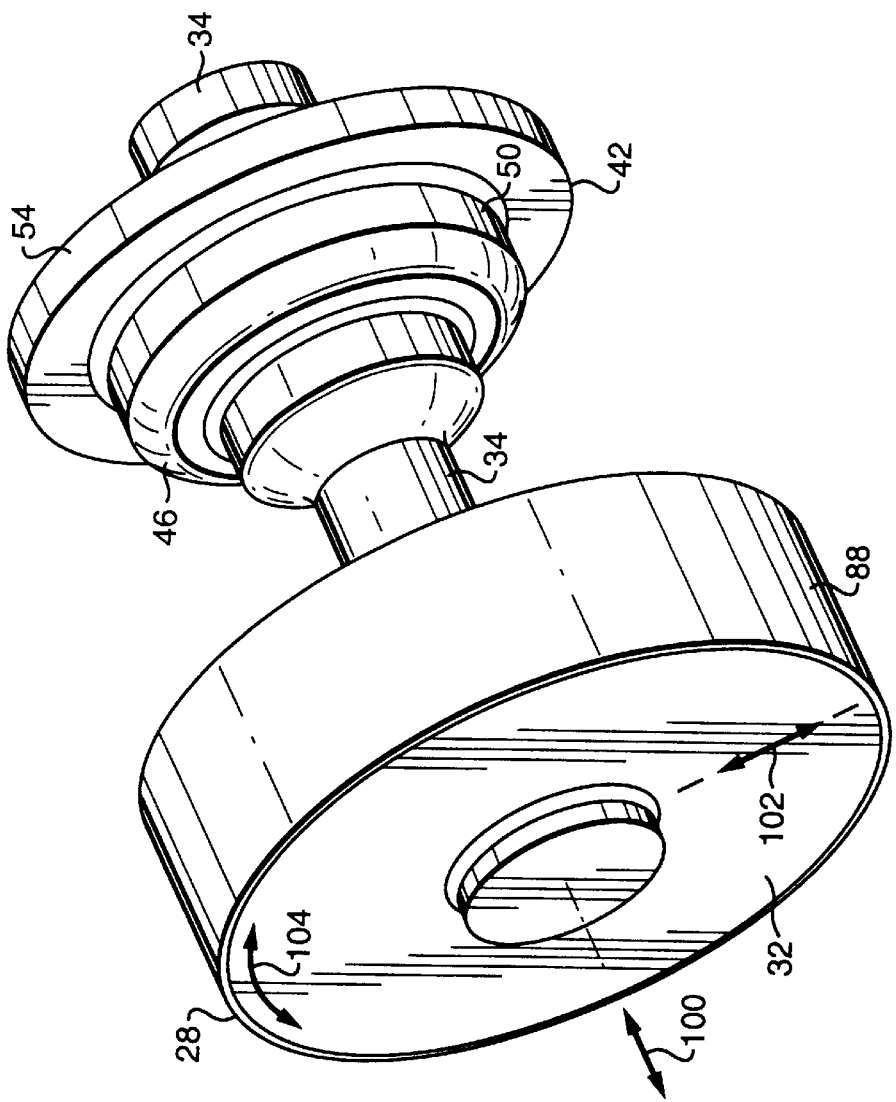
FIG. 5 shows a representative, perspective view of another horn member and isolation member that can be employed with the method and apparatus of the invention.

With reference to FIGS. 1, 2 and 5, the various components employed with the method and apparatus can have an axial direction 100, a radial direction 102, and a circumferential direction 104. The axial direction 100 extends along an appointed rotational axis of a selected component or member. The radial direction 102 extends radially from the rotational axis, and is substantially perpendicular to the rotational axis of the selected component or member. The circumferential direction 104 is directed along an orbital path around the rotational axis of the selected component or member, and is aligned substantially perpendicular to the radial direction 102 and substantially perpendicular to the axial direction 100.

As illustrated in FIGS. 1 and 2, a representative method and apparatus 20 for ultrasonically processing a target material 98 can include a rotary, ultrasonic horn member 28, and a cooperating, rotary ultrasonic anvil member 86. In a particular configuration, the method and apparatus can be arranged to provide a bonding operation. The rotatable anvil member 86 can be cooperatively positioned proximate the horn member 28, and an ultrasonic power source or exciter 82 can be operatively connected to the horn member. Typically, the horn member and anvil member can be configured to counter-rotate with respect to each other, and provide a nip region therebetween where the ultrasonic bonding operation can be conducted. A suitable horn drive 92 can be configured to rotate the horn member, and a suitable anvil drive 94 can be configured to rotate the anvil member. The horn drive and anvil drive may be provided by individual, separately provided driving mechanisms, or may be provided by the same driving mechanism. In a particular arrangement, the horn member may be rotated by the selected driving mechanism, and the anvil member may be driven by a contact pressure that is generated in the nip region between the horn member 28, target work material 98 and anvil member 86. Suitable driving systems can include take-offs from a powered line shaft, motors, engines, electric motors or the like, as well as combinations thereof.

The rotatable anvil member 86 has a rotational axis 114, and can be rotated by its corresponding rotational drive 94 to provide a minimum, anvil speed at its outer peripheral surface 90. In a particular aspect, the anvil peripheral speed can be at least a minimum of about 5 m/min. The anvil peripheral speed can alternatively be at least about 7 m/min, and optionally, can be at least about 9 m/min to provide improved performance. In another aspect, the anvil peripheral speed can be up to a maximum of about 700 m/min, or more. The anvil peripheral speed can alternatively be up to about 600 m/min, and optionally, can be up to about 550 m/min to provide improved effectiveness. The anvil speed may be substantially constant, or may be non-constant or variable, as desired.

As representatively shown, the anvil member 86 can have a substantially circular, disk-shape, and an outer peripheral surface 90 of the anvil member may be substantially continuous. Alternatively, the anvil member may have a non-circular shape. Additionally, the outer peripheral surface of the anvil member may be discontinuous. Optionally, the anvil member may have a shape composed of one or more spoke or lobe members, and the spoke or lobe members may have the same size and/or shape, or may have different sizes and/or shapes.

The horn member 28 has a rotational axis 112, and can be rotated by its corresponding rotational drive 92 to provide a horn speed at its outer peripheral surface 88 which substantially equals the anvil peripheral speed. Optionally, the peripheral speed of the horn member 28 can be mismatched and unequal to the peripheral speed of the anvil member 86.

As representatively shown, the horn member 28 can have a substantially circular, disk-shape, and an outer peripheral surface 88 of the horn member may be substantially continuous. Optionally, the horn member may have a non-circular shape. Additionally, the outer peripheral surface of the horn member may have a discontinuous configuration.

An ultrasonic exciter 82 can be operatively connected to direct a sufficient amount of ultrasonic power into the horn member 28 through suitable, ultrasonic wave-guides, booster members, and connection/transmission components. Suitable ultrasonic exciters, ultrasonic connectors, ultrasonic boosters and ultrasonic wave-guides are well known in the art and are available from commercial vendors.

With reference to FIGS. 3 through 9, a desired method and apparatus 20 for bonding or other processing can include a rotatable ultrasonic horn member 28 and a rotatable axle member 34. The horn member can have a first axial side 30 and a second axial side 32. The axle member can be operatively joined to the horn member 28, and an isolation member 42 can be operatively connected to the horn member 28. In a particular aspect, the isolation member 42 is capable of dynamically flexing and bending under a horn-life range of sonic frequencies to provide an operative component of motion along a radial direction 102 of the isolation member, and can provide an operative component of motion along an axial direction 100 of the isolation member.

In other aspects, the axle member 34 can provide a node plane 38, and the isolation member 42 can be located operatively proximate the node plane of the axle member. As illustrated in the representatively shown configuration, the axle member 34 can be configured to provide by an operative wave-guide which can direct ultrasonic energy from a suitable ultrasonic power source to the horn member.

In particular configurations the axle member 34 may provide a node plane and/or an anti-node plane. The isolation member 42 may be positioned substantially at or closely adjacent its corresponding node plane; may be positioned substantially at or closely adjacent its corresponding anti-node plane; or may be positioned at a location that is spaced away from its corresponding node plane or anti-node plane; as desired.

In further aspects, the isolation member 42 can have high rigidity and stiffness, and can be substantially non-elastomeric. The dynamic bending of the isolation member can be substantially non-elastomeric, and can be provided by a mechanism that is substantially free of a component constructed with an elastomer, such as natural or synthetic rubber. In still other aspects, the isolation member can provide a generally cantilevered flexing and bending. Additionally, the isolation member can provide for an operative component of bending or flexure displacement which is directed transverse the radial direction of the isolation member, and can provide for an operative component of bending or flexure displacement which is directed transverse to the axial direction of the isolation member.

In still another aspect, the isolation member 42 can have a radial isolation component 46 and an axial isolation component 50. The radial isolation component 46 can be operatively joined to the axle member 34, and can be configured to extend at least, substantially radially from the axle member 34. In a particular aspect, the radial isolation component can extend from the axle member with a generally cantilevered configuration. The radial isolation component 46 can be configured to operatively flex and bend under the horn-life range of sonic frequencies. Additionally, the radial isolation component can dynamically bend to provide transverse displacements that are directed along a thickness dimension of the radial isolation component. Accordingly, a dynamic bending of the radial isolation component can swing generally along the axial direction of the isolation member.

The axial isolation component 50 can be operatively joined to an operative portion of the radial isolation component 46, and can be configured to extend at least axially from the radial isolation component 46. In a particular aspect, the axial isolation component can extend from the radial isolation component with a generally cantilevered configuration. The axial isolation component 50 can be configured to operatively flex and bend under the horn-life range of sonic frequencies. Additionally, the axial isolation component can dynamically bend to provide transverse displacements that are directed along a thickness dimension of the axial isolation component. Accordingly, a dynamic bending of the axial isolation component can swing generally along the radial direction of the isolation member.

The various aspects, features and configurations of the method and apparatus, taken alone or in combination, can provide a distinctive, rotary ultrasonic horn system which includes a corresponding wave-guide, such as provided by the axle member 34, and at least one isolation member 42 that has high rigidity and stiffness. The isolation member can operably isolate the radial motion that can arise at the longitudinal node of the wave-guide, and can provide sufficient bandwidth to compensate for nodal shifts that can occur during ordinary operation. In particular, the isolation member can compensate for changes in the real-time location of the actual nodal plane that arises during the actual transfer of ultrasonic energy through the wave-guide. The isolation member can also provide improved stiffness to reduce deflections under load. The increased stiffness can help maintain concentricity, and help to reduce run-out displacements at the working surface of the horn member. Additionally, the isolation member can more efficiently transmit torque to the horn member, and can provide improved effectiveness and operating efficiency. The isolation member can also be configured to reduce stress concentrations and to increase fatigue resistance. Additionally, the isolation member can provide for a mounting system that can reduce relative motions between component parts. The method and apparatus can eliminate the need for elastomeric isolation components, such as conventional elastomeric O-rings and associated isolation ring hardware. The method and apparatus can also reduce the need for torque transmission keys, and can avoid the use of auxiliary support wheels for maintaining the desired locations of the rotary horn and rotary anvil.

Horn members that can be employed in the method and apparatus are well known in the art. For example, suitable rotary ultrasonic horn members are disclosed in U.S. Pat. No. 5,096,532 entitled ULTRASONIC ROTARY HORN by Joseph G. Neuwirth et al. which issued Mar. 17, 1992; U.S. Pat. No. 5,110,403 entitled HIGH EFFICIENCY ULTRASONIC ROTARY HORN by Thomas D. Ehlert et al. which issued May 5, 1992; and in U.S. Pat. No. 5,087,320 entitled ULTRASONIC ROTARY HORN HAVING IMPROVED END CONFIGURATION by Joseph G. Neuwirth which issued Feb. 11, 1992. The entirety of each of these documents is incorporated herein by reference, in a manner that is consistent herewith.

The incorporation of one or more wave-guides, such as provided by the axle member 34, is also well known in the art. The construction and arrangement of a suitable wave-guide is conventional, and can be conducted with commonly understood engineering techniques that are employed for ultrasonic processing systems, such as ultrasonic bonding systems.

For the present disclosure, the node plane of the selected wave-guide is a longitudinal node located along the axial direction of the method and apparatus. At the node plane, approximately zero longitudinal (e.g. axial) displacements are present during ordinary operation with the selected ultrasonic excitations. Radial displacements, however, can continue to occur at the longitudinal node.

Rotatable anvil members that can be employed in the method and apparatus are well known in the art, and are available from commercial vendors. Examples of such vendors include Sonobond, a business having offices located in West Chester, Pa.; and Branson Ultrasonics, a business having offices located in Danbury, Conn.

Conventional ultrasonic exciters and power sources can be employed in the method and apparatus of the invention, and are available from commercial vendors. Examples of suitable ultrasonic power systems include a Model 20A3000 system available from Dukane Ultrasonics, a business having offices located in St. Charles, Ill.; and a Model 2000CS system available from Herrmann Ultrasonics, a business having offices located in Schaumburg, Ill. In a particular aspect, the method and apparatus can include an ultrasonic exciter 82 which is operatively connected to the horn member 28, and is capable of providing an operative amount of ultrasonic energy at a frequency within the range of about 15–60 KHz (Kilo-Hertz). It should be appreciated that other operative ultrasonic frequencies may also be employed.

With reference to FIGS. 3 through 6A, at least one region of the isolation member 42 can bend under the selected horn-life range of sonic frequencies to provide an operative component of beam-type, flexing or bending displacement which is aligned generally transverse to the radial direction of the isolation member. In a particular aspect, the isolation member can provide for one or more regions that can exhibit one or more dynamic bending and flexing displacements or movements that are directed generally along the axial direction of the isolation member. For example, the radial isolation component 46 of the isolation member can be configured to provide for one or more dynamic bending and flexing displacements that can swing back-and-forth in a path that extends generally along the axial direction of the isolation member. In a desired aspect, the isolation member can move in the manner of an oscillating diaphragm. In a more particular aspect the radial isolation component 46 can move in the manner of an oscillating diaphragm.

The isolation member can also provide for one or more regions that can exhibit one or more beam-type bending and flexing displacements or movements that are directed generally transverse to the axial direction of the isolation member. In a particular aspect, the isolation member can provide for one or more regions that can exhibit one or more dynamic bending and flexing displacements or movements that are directed generally along the radial direction of the isolation member. For example, the axial isolation component 50 can be configured to provide for one or more dynamic bending and flexing displacements that can vibrationally swing back-and-forth in a path that extends generally along the radial direction of the isolation member. It should be readily appreciated that, in additional to the described bending and flexing displacements exhibited by the isolation member 42, the isolation member may experience other dynamic motions that are typically induced during ordinary ultrasonic bonding operations.

It has been discovered that the traversing, dynamic bending and flexing displacements that can be induced generally along the axial direction and/or radial direction can help compensate for any mismatch between the location of the isolation member and the location of the associated node plane. In a more particular aspect, the traversing dynamic bending and flexing displacements can help compensate for any mismatch between (a) the physical location at which the isolation member 42 connects to its corresponding axle member 34, and (b) the actual location of the corresponding dynamic node plane 38, along the axial length of the corresponding axle member 34. Such mismatches can occur during the operation of the method and apparatus due to shifts caused by changes in temperature, changes in ultrasonic-frequency, changes in the target work material or the like, as well as combinations thereof.

The dynamic flexing and bending displacements that are transverse to the radial and/or axial direction of the isolation member can desirably be provided without generating excessive fatigue of the corresponding isolation member. Where the particular isolation member has a discretely identifiable, radial isolation components 46 and/or a discretely identifiable, axial isolation components 50, each of such radial and/or axial isolation components can each be configured to bend without excessive fatigue by employing conventional parameters and design techniques that are well known in the art. For example, the length, thickness, elastic modulus, and other parameters can be selected and configured to provide the operative bending and fatigue resistance of the radial isolation component. Similarly, the length, thickness, elastic modulus, and other parameters can be selected and configured to provide the operative bending and fatigue resistance of the axial isolation component.

In a particular aspect, the isolation member can operate under its intended, ordinary operating conditions for a minimum of about 4000 hours without excessive fatigue failure. The isolation member can desirably provide a minimum ultrasonic operating life of about 5000 hours substantially without fatigue failure, as determined under its intended, ordinary operating conditions, and can more desirably provide a minimum ultrasonic operating life of about 6000 hours substantially without fatigue failure.

In a particular aspect, the isolation member can be configured such that during ordinary operation, the isolation member will be subjected to a stress level that is not more than about 10% of the yield strength of the isolation member. Alternatively, the isolation member can be configured such that during ordinary operation, the isolation member will be subjected to a stress level that is not more than about 1% of the yield strength of the isolation member.

The isolation member can be configured to operatively bend and swing back-and-forth under a horn-life range of sonic frequencies to provide an operative component of motion along a radial direction and an operative component of motion along an axial direction. The horn-life range of frequencies can be a range that is about ±3% of the nominal ultrasonic frequency. The nominal frequency is the target ultrasonic frequency at which the method and apparatus is intended to operate to perform the selected processing operation.

In the various configurations of the method and apparatus of the invention, the radial isolation component can extend discontinuously or substantially continuously along a circumferential direction of the isolation member. With reference to FIGS. 3 through 6A, the representatively shown radial isolation component 46 can be substantially disk-shaped, or can be substantially annular-shaped, as desired.

With reference to FIGS. 3 through 8, the axial isolation component 50 can be configured to provide a substantially axial extension from the radial isolation component 46. In the example of the representatively shown arrangement, the axial isolation component 50 can be configured to provide an extension which is directed along the axial direction from a radially outboard section of the radial isolation component 46. The axial isolation component can be configured to provide a discontinuous or a substantially continuous axial extension from the radial isolation component. Additionally, the axial isolation component can be configured to extend discontinuously, or substantially continuously along a circumferential direction 104 of the isolation member. In the example of the representatively shown configuration, the axial isolation component 50 can be substantially cylinder-shaped.

In the various configurations of the invention, the horn member, the associated axle member or members and the cooperating isolation member or members can be components that are separately provided and operatively attached together. Alternatively, the horn member, the associated axle member(s) and the cooperating isolation member(s) may be integrally formed from a single piece of material that is suitable for constructing ultrasonic bonding devices. For example, the horn member, axle members and isolation members can be machined from the same piece of bar stock.

With regard to the isolation member 42, the axial isolation component 50 and the radial isolation component 46 can be separately provided pieces that are operatively attached together, or may be integrally formed from the same piece of material that is suitable for constructing ultrasonic bonding devices. For example, the axial isolation component and the radial isolation component can be formed from the same piece of bar stock material.

Figure 10A:
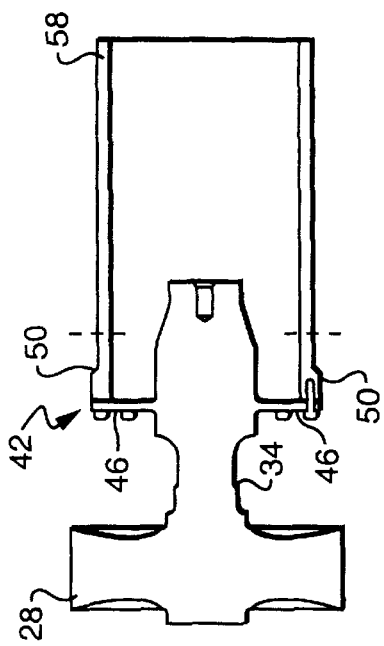
FIG. 10A shows a schematic view of a cross-section through another configuration of a horn member and isolation member wherein the isolation member has an axial isolation component which is separately provided from the radial isolation component, and the axial isolation component is integrally formed with a cooperating coupler.

In an alternative configuration, the axial isolation component 50 can be separate from the radial isolation component 46. In another feature, the axial isolation component may be integrally formed with a cooperating coupler member 58. An appointed section of the axial isolation component can then be attached and secured to the separately provided, cooperating radial isolation component 46. As representatively shown in FIG. 10, the radial isolation component may be press-fitted into the axial isolation component. As illustrated in FIG. 10A, the radial isolation component may be bolted or otherwise secured to the axial isolation component.

Figure 10C:
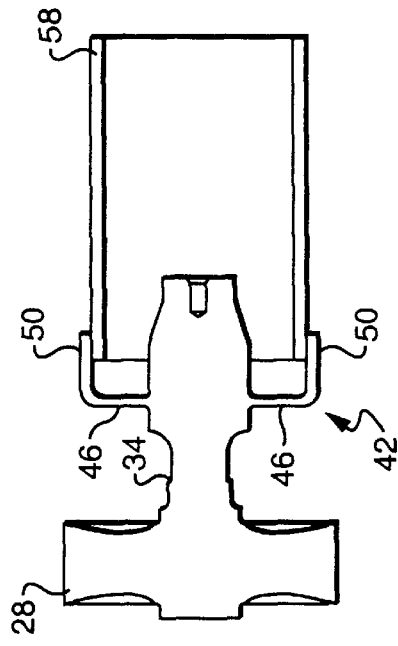
FIG. 10C shows a schematic view of a cross-section through a configuration of a horn member and isolation member wherein a cooperating coupler is press-fitted into the axial isolation component of the isolation member.
Figure 10:
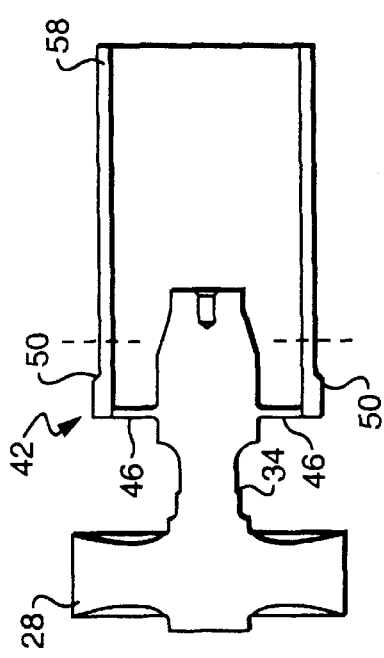
FIG. 10 shows a schematic view of a cross-section through a configuration of a horn member and isolation member wherein the isolation member has an axial isolation component which is separately provided from the radial isolation component, and the axial isolation component is integrally formed with a cooperating coupler.
Figure 10B:
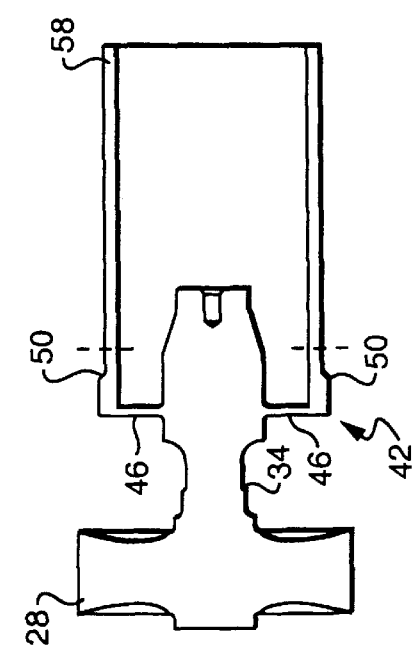
FIG. 10B shows a schematic view of a cross-section through a configuration of a horn member and isolation member wherein the isolation member has an axial isolation component which is integrally provided with the radial isolation component, and the isolation member is integrally formed with a cooperating coupler.

In an optional arrangement, the isolation member 42 can have an axial isolation component 50 which is integrally provided with the radial isolation component 46, and the isolation member can be integrally formed with its cooperating coupler, as representatively shown in FIG. 10B. The radial isolation component can be operatively attached to the axle member 34 with any suitable securement system.

Another arrangement of the isolation member 42 can have the cooperating coupler 58 press-fitted into the axial isolation component 50 of the isolation member 42, as illustrated in FIG. 10C. It should be readily appreciated that the axial isolation component 50, radial isolation component 46 and axle member 34 can additionally be interconnected together in any operative configuration.

The method and apparatus can include at least one, and optionally a plurality, of rotational couplers, such as provided by one or more couplers 58. In the various arrangements of the invention, each coupler can be configured to be operatively similar to some or all of the other couplers. Accordingly, the arrangements, structures features, operational features or other configurations that are described with respect to a particular coupler may also be incorporated by the other couplers.

As representatively shown in FIGS. 4 through 10C, the isolation member 42 can be joined to a rotatable coupler 58 which, in turn, can be supported by at least one rotational bearing 66 and associated mounting structure. Accordingly, the coupler 58 can interconnect between the isolation member 42 and the rotational bearing 66. In a desired configuration, the rotational bearing 66 and a corresponding mount 70 can fixedly hold and support the rotatable coupler 58. The bearing mount can be positioned generally adjacent the node plane of the axle member. Alternatively, the bearing mount can be spaced from the node plane of the axle member by a significant distance. As representatively shown, the bearing support mount 70 can be positioned generally adjacent the node plane 38 provided by the axle member 34.

Figure 6:
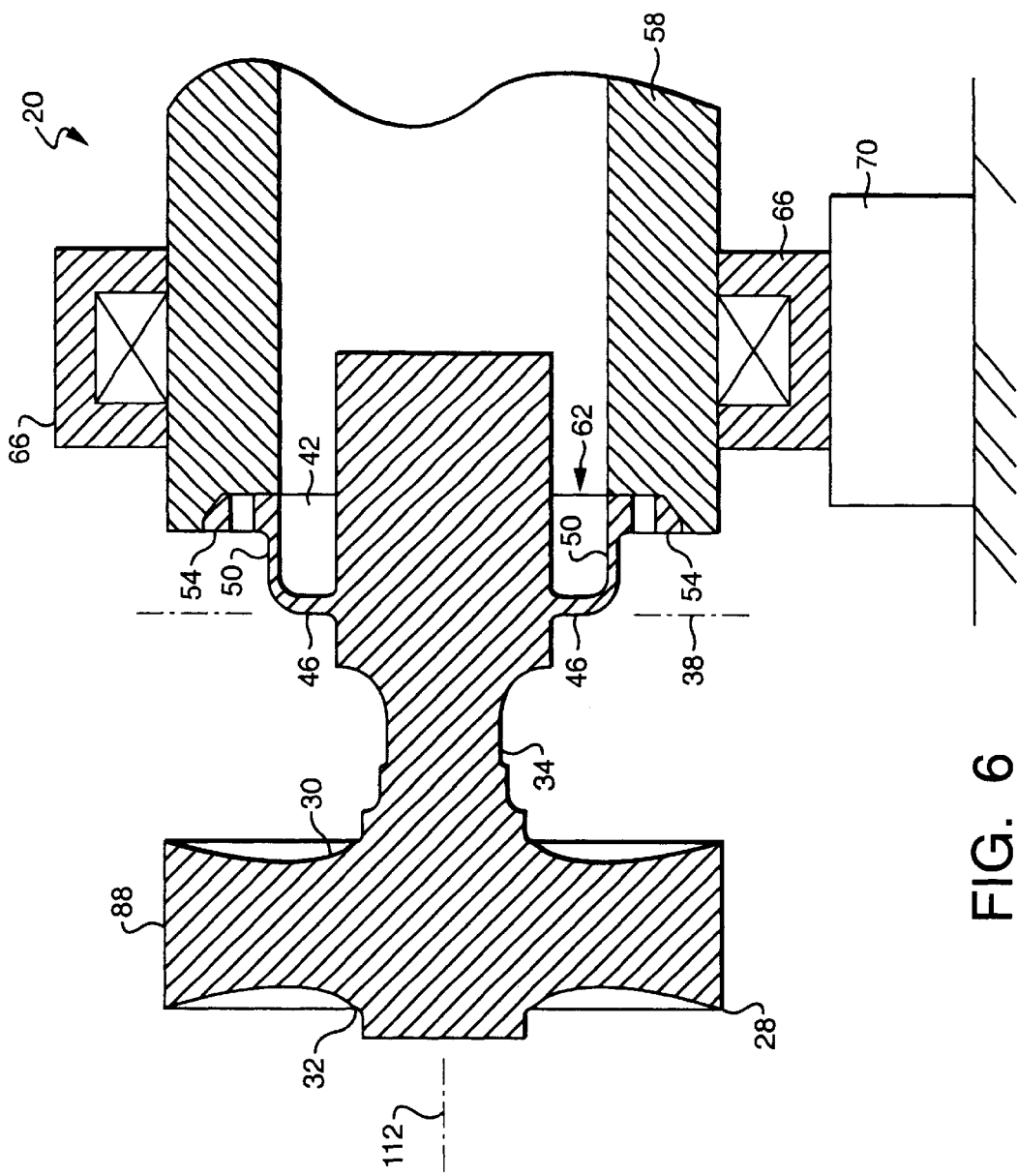
FIG. 6 shows a schematic view of a cross-section through a rotatably mounted configuration of the horn member and isolation member illustrated in FIG. 5.
Figure 6A:
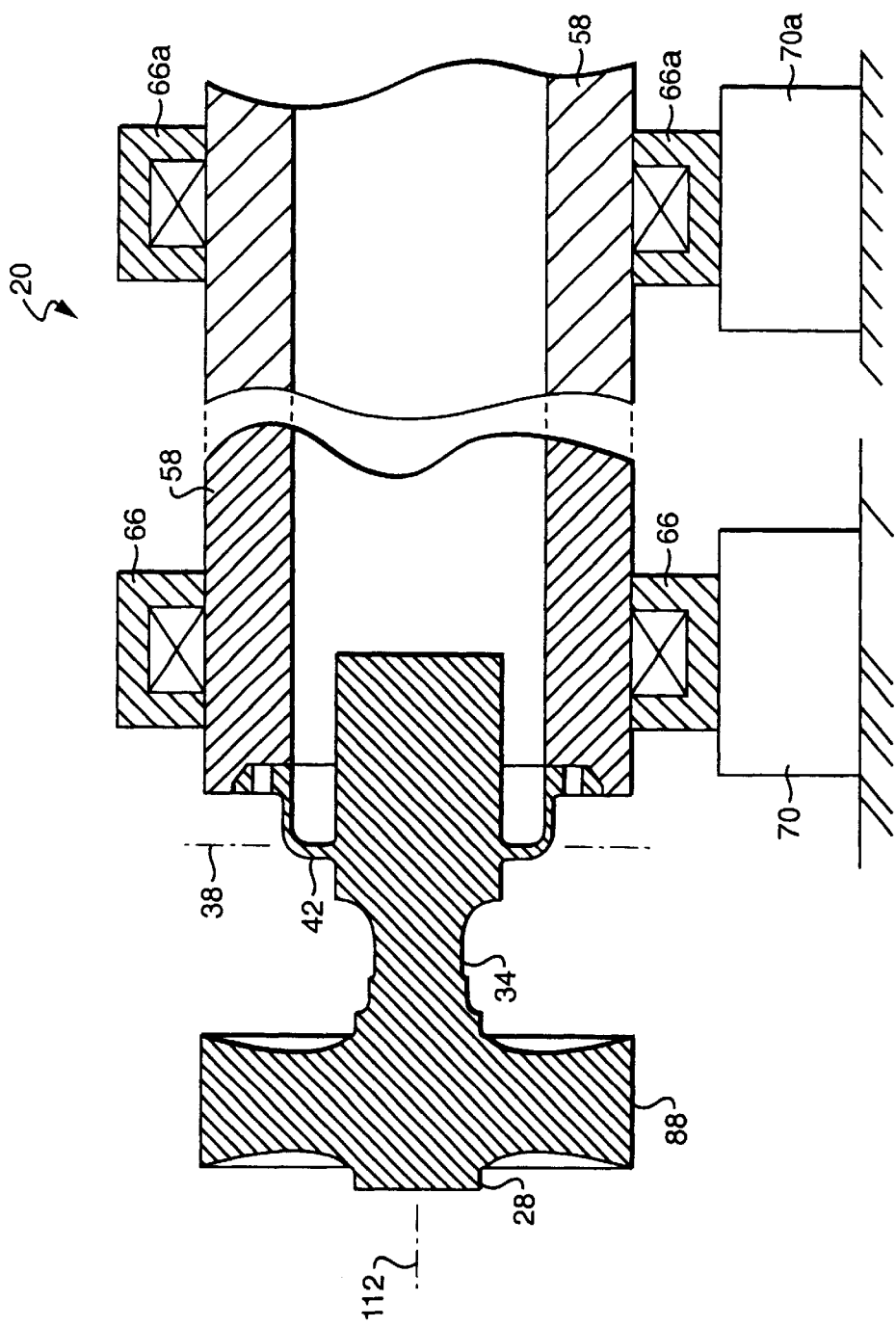
FIG. 6A shows a schematic view of a cross-section through an arrangement wherein the horn member and isolation member are rotatably mounted with a plurality of support bearings.
Figure 7:
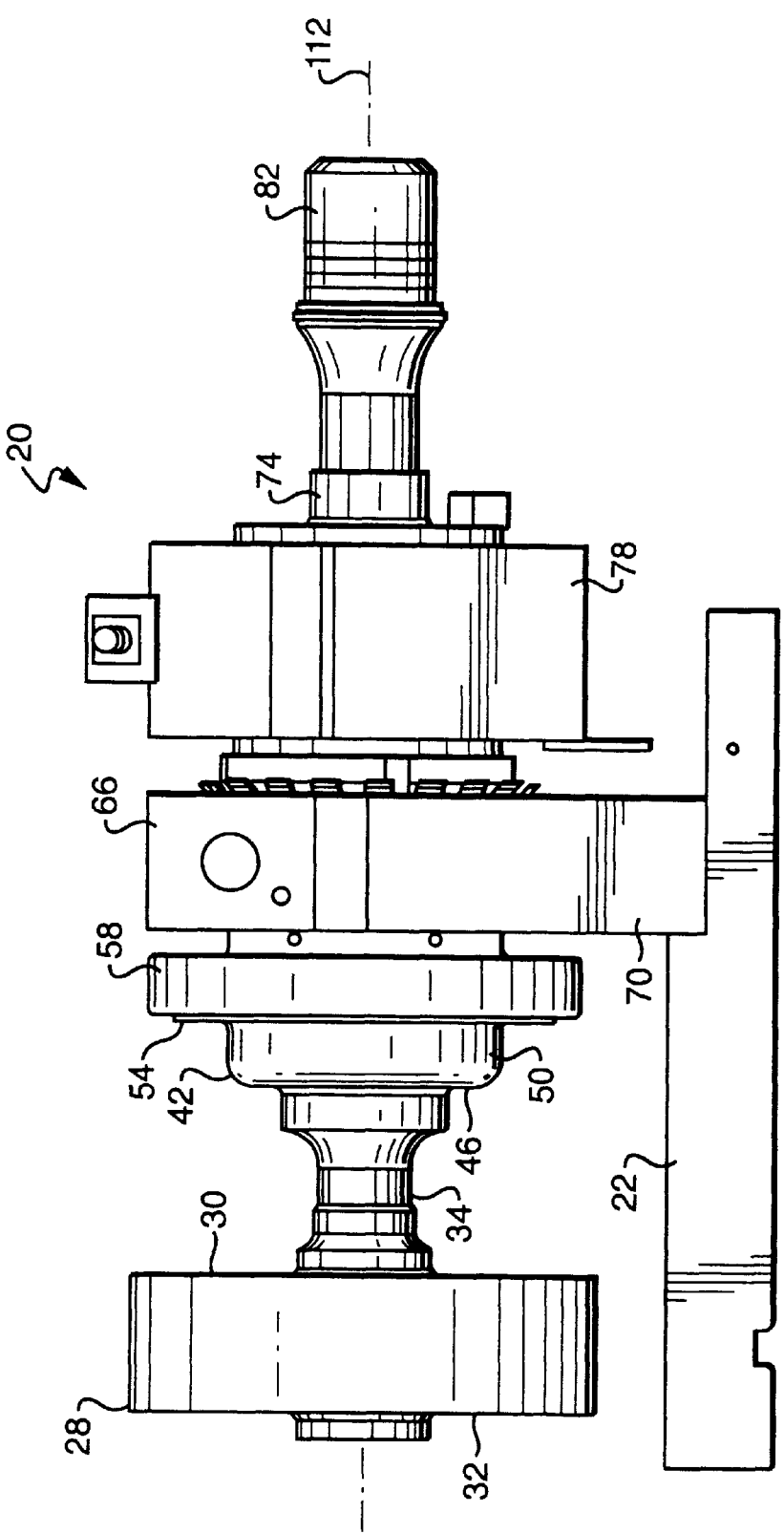
FIG. 7 shows a schematic side view of a representative horn member and isolation member mounted with associated components on a substantially non-resilient bearing.
Figure 9:
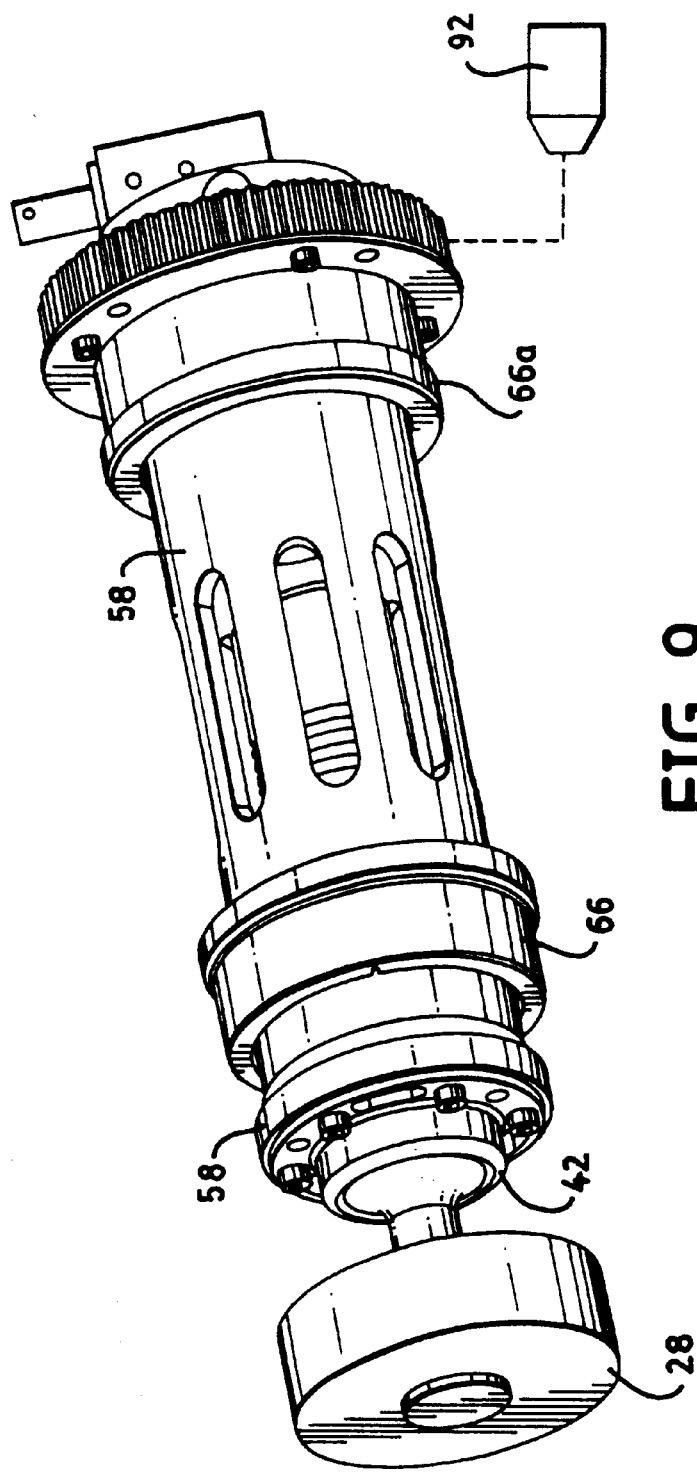
FIG. 9 a representative perspective view a horn member and isolation member which can be mounted with a pair of rigid, substantially non-resilient, support bearings.

With reference to FIGS. 6A and 9, the horn member 28 can be held in a cantilevered position with a plurality of bearing members 66 and 66a and associated support mounts 70 and 70a. The coupler 58 can be extended along its axial dimension, and a pair of bearing members can be arranged with one bearing member located proximate each axial end of the coupler. The bearing members can be attached to their corresponding support mounts in a manner that can hold the coupler in a substantially fixed position which exhibits high rigidity and stiffness. Appropriate booster members and wave-guides can be configured to extend through the coupler and operably connect to the axle member 34 and horn member 28.

In a particular aspect, the method and apparatus of the invention can be configured to provide a rotatable horn member 28 which exhibits a very low static deflection. In a desired configuration, the static deflection can be about 0.025 mm (about 0.0005 inch) or less, when subjected to a static force of 445 N (100 lb) which is directed against the outer peripheral surface 88 of the horn member 28 at a location that is centered along the axial dimension of the surface 88, and along the radial direction of the rotatable horn. In other configurations, the static deflection can be up to a maximum of about 0.76 mm (about 0.03 inch). The horn deflection can alternatively be not more than about 0.5 mm (about 0.02 inch), and can optionally be not more than about 0.3 mm (about 0.012 inch) to provide improved effectiveness. In a particular arrangement, the static deflection of the horn member can be not more than about 0.076 mm (about 0.003 inch).

The method and apparatus can further be configured to provide a rotatable horn member 28 which exhibits distinctively low level of dynamic run-out. In a desired feature, the horn run-out can be about 0.0025 mm (about 0.00001 inch) or less, at a rotational speed of 5 revolutions/minute. In a further feature, the horn member can exhibit a maximum run-out of not more than about 0.018 mm (about 0.0007 inch). The horn run-out can alternatively be not more than about 0.013 mm (about 0.0005 inch), and can optionally be not more than about 0.01 mm (about 0.0004 inch) to provide improved performance.

With reference to the aspects of the invention illustrated in FIGS. 3 through 6A, the isolation member 42 can have a generally annular-shaped, radial isolation component 46 which has high rigidity and stiffness, and is connected and attached to the wave-guide provided by axle member 34. The attachment is positioned at approximately the expected node plane of the wave-guide, axle member. A generally cylindrical-shaped axial isolation component 50 can have relatively high rigidity and stiffness, and can be connected and attached to a distal outer edge region of the radial isolation component 46. The axial isolation component can extend from the radial isolation component in an inboard direction toward the horn member 28, or in an outboard direction away from the horn member. Alternatively, the axial isolation component can extend in both the inboard and outboard directions.

Figure 3:
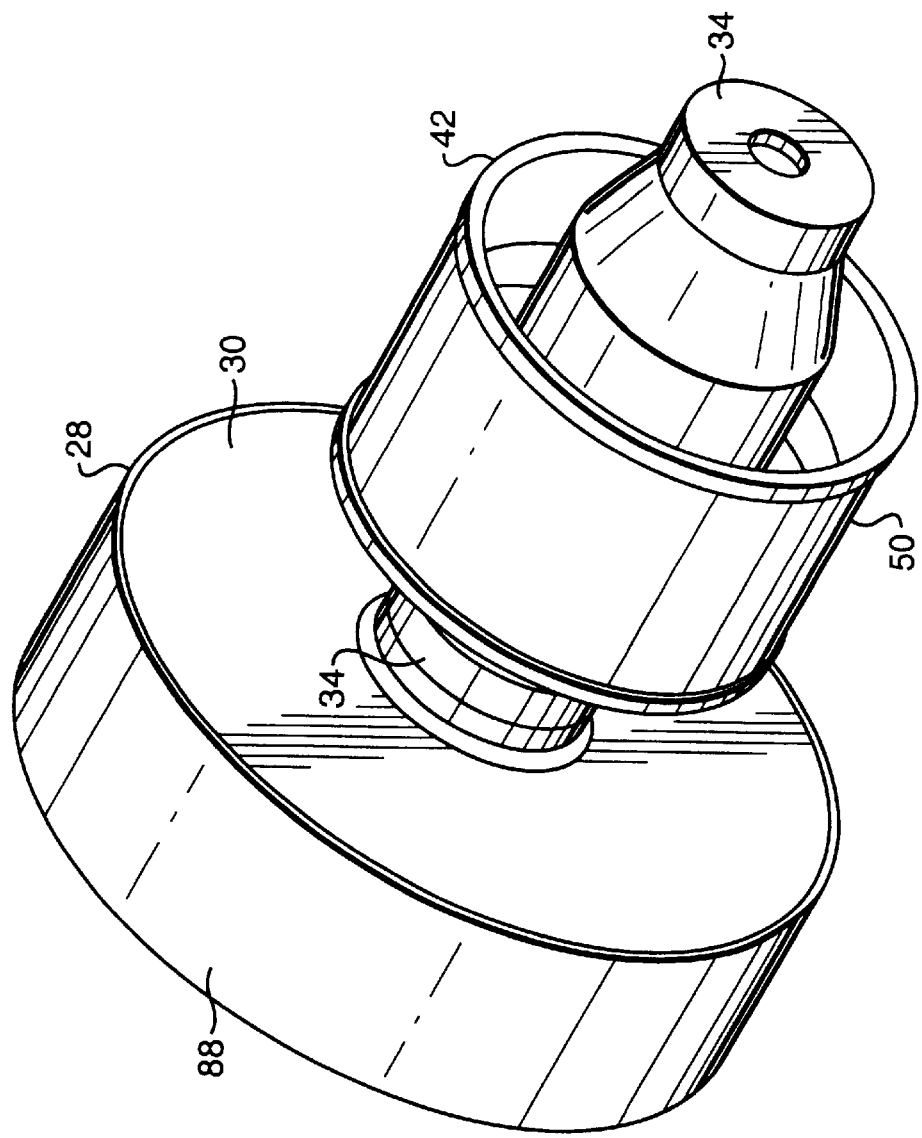
FIG. 3 shows a representative, perspective view of a representative horn member and isolation member that can be employed with the method and apparatus of the invention.
Figure 4:
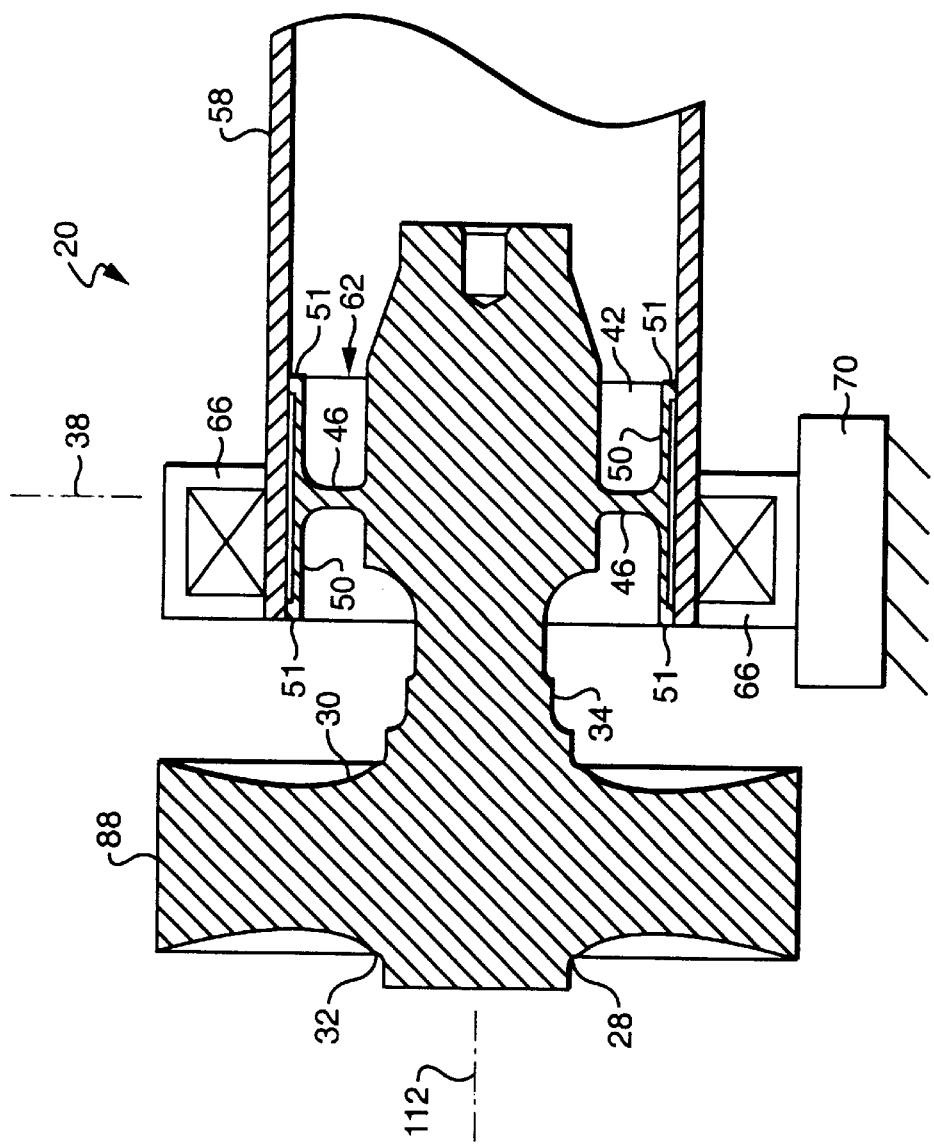
FIG. 4 shows a schematic view of a cross-section through a rotatably mounted configuration of the horn member and isolation member illustrated in FIG. 3.

As illustrated in the arrangements shown in FIGS. 3 and 4, the axial isolation component 50 may extend in both the inboard and outboard directions by substantially equal distances. Optionally, the axial isolation component may extend in both the inboard and outboard directions by different, unequal distances. The axial isolation component 50 can include one or more radially projecting, substantially annular spacers 51 which hold the axial isolation component at a spaced distance from its corresponding coupler 58. As representatively shown, each of a pair of spacers 51 can be located each opposed, axial end of the axial isolation component. The spaced distance is configured to allow an operative amount of dynamic, bending flexure of the axial isolation component.

With reference to the aspects of the invention illustrated in FIGS. 5, 6 and 6A, the isolation member 42 can include a generally annular-shaped, radial isolation component 46 which has high rigidity and stiffness, and is connected and attached to the wave-guide provided by axle member 34. The attachment is positioned at approximately the expected node plane of the wave-guide, axle member. A generally cylindrical-shaped axial isolation component 50 is configured to have high rigidity and stiffness, and is connected and attached to an outer edge region of the radial isolation component 46. The axial isolation component can extend from the radial isolation component in an outboard direction away from the horn member.

In the various arrangements of the method and apparatus, the configuration of the attachment or other operative connection between the axle member and its corresponding, connected isolation member can be substantially free of rubber or other elastomeric components. Accordingly, the attachment mechanism can provide an operative connection that has high rigidity and stiffness, and is substantially non-resilient.

The isolation member 42 can include a diaphragm-like element and a mounting flange 54. The diaphragm-like element can include a substantially continuous radial component 46 which has high rigidity and stiffness, and extends substantially radially from the axle member 34 or other wave-guide. Additionally, the radial component 46 can be positioned at approximately the nodal plane 38 of the axle member or other wave guide. The radial component can project radially outward with a length that can allow this radial component to operatively bend under normal horn-life frequency ranges without sacrificing fatigue life. Moving outward from the radial component, the structural shape of the isolation member 42 can transition to provide an axial component 50 which extends along the axial direction of the isolation member. As representatively shown, the axial component can have a generally cylinder-shape that projects substantially parallel to the rotational axis of the wave-guide or axle member 34.

The lengths of the radial and axial components of the isolation member 42 are long enough to allow these components to dynamically flex and bend through the normal range of radially and axially-directed motions that can arise at or near the node of a wave-guide during its intended operation. In particular, the axial length of the cylinder-shape can dynamically flex and bend through the normal range of radially directed motions that can arise at or near the node of a wave-guide. Such radially-directed motion can ordinarily arise from resonant oscillations caused by the ultrasonic energy directed into the horn member 28. The radial length of the diaphragm-shape can dynamically flex and bend through the normal range of axially-directed motions that can arise at or near the node of a wave-guide. Such axially-directed motion can also arise from resonant oscillations caused by the ultrasonic energy directed into the horn member 28. The combination of the dynamic bending movements of the radial and axial components of the isolation member can act to dampen the radial and axial motions induced in the horn 28 and wave-guide (e.g. axle member 34) during the normal, oscillatory expansions and contractions that are excited by the ultrasonic power source. The dampening can occur through the normal range of ultrasonic frequencies to which the horn 28 is subjected during ordinary operation.

At a selected region, such as at an extreme outer diameter of the isolation member 42, an operative fastening/affixing mechanism or method can be employed to attach and secure the isolation member to other components of the ultrasonic bonding system, such as the coupler 58. As representatively shown, for example, the fastening mechanism can be located at an extreme outer diameter of the axial isolation component 50. In one arrangement, the isolation member 42 (e.g. the axial isolation component 50 of the isolation member) can include an extending flange portion 54. As representatively shown, the joining flange 54 can include a generally radially extending section and may include a generally axially extending section. In a desired aspect, the joining flange can be operatively positioned and secured in the coupler opening 62. In another aspect, the coupler flange portion 54 can be operatively affixed to the coupler opening 62 by including an interference, friction-fit. The flange can, for example, be press-fit into a bore opening, such as that provided by the coupler opening 62, and may additionally or alternatively be held in place by fasteners.

Alternatively, an interference, friction-fit can be generated by heat-expanding the part having the appointed opening (e.g. coupler opening 62), and inserting into the expanded opening the component or component part that is intended to be captured or held (e.g. isolation member 42). When the heat dissipates, the opening can contract and help secure the inserted component.

In another fastening arrangement, the flange can be appropriately extended, as needed, and a clamping arrangement can be employed to hold the isolation member in place. Yet another fastening arrangement could incorporate a single extension having a surface suitable for clamping.

In a further aspect, the connecting flange can be substantially contiguously and integrally formed with its corresponding isolation member 42. Optionally, the flange may be a separately provided component that is subsequently affixed to the isolation member. Additionally, the isolation member can substantially continuously and integrally formed with its corresponding wave-guide or axle member 34. Accordingly, the horn can more accurately be held in a selected position, can better maintain a desired position when subjected to a much greater load. Additionally, a desired rotational driving torque can be more efficiently transmitted to the horn 28.

In a desired feature, the coupler can provide a holding and securing force that is distributed substantially evenly around the circumference of the axial isolation component. For example, the coupler can provide a substantially evenly distributed, compressive securing force that is directed substantially radially-inward against the axial isolation component. Optionally, the axial isolation component may provide a substantially evenly distributed, compressive securing force that is directed substantially radially-inward against the coupler.

The coupler 58 can provide a coupler opening 62 into which the first isolation member 42 is operatively positioned and secured. In a particular aspect, the axial isolation component 50 of the isolation member 42 can be operatively positioned and secured in the coupler opening 62 (e.g. FIGS. 4 and 6). For example, the coupler 58 can provide a substantially cylinder-shaped, coupler opening 62 into which the axial isolation component 50 of the isolation member 42 can be operatively positioned and secured. The isolation member may, for example, be press-fitted into the coupler opening.

Optionally, the axial isolation component can be configured to provide an isolation-member opening, and an operative end-portion of the coupler can be operatively positioned and secured in the isolation-member opening. For example, the coupler may be press-fitted into the opening of the isolation member.

Figure 8:
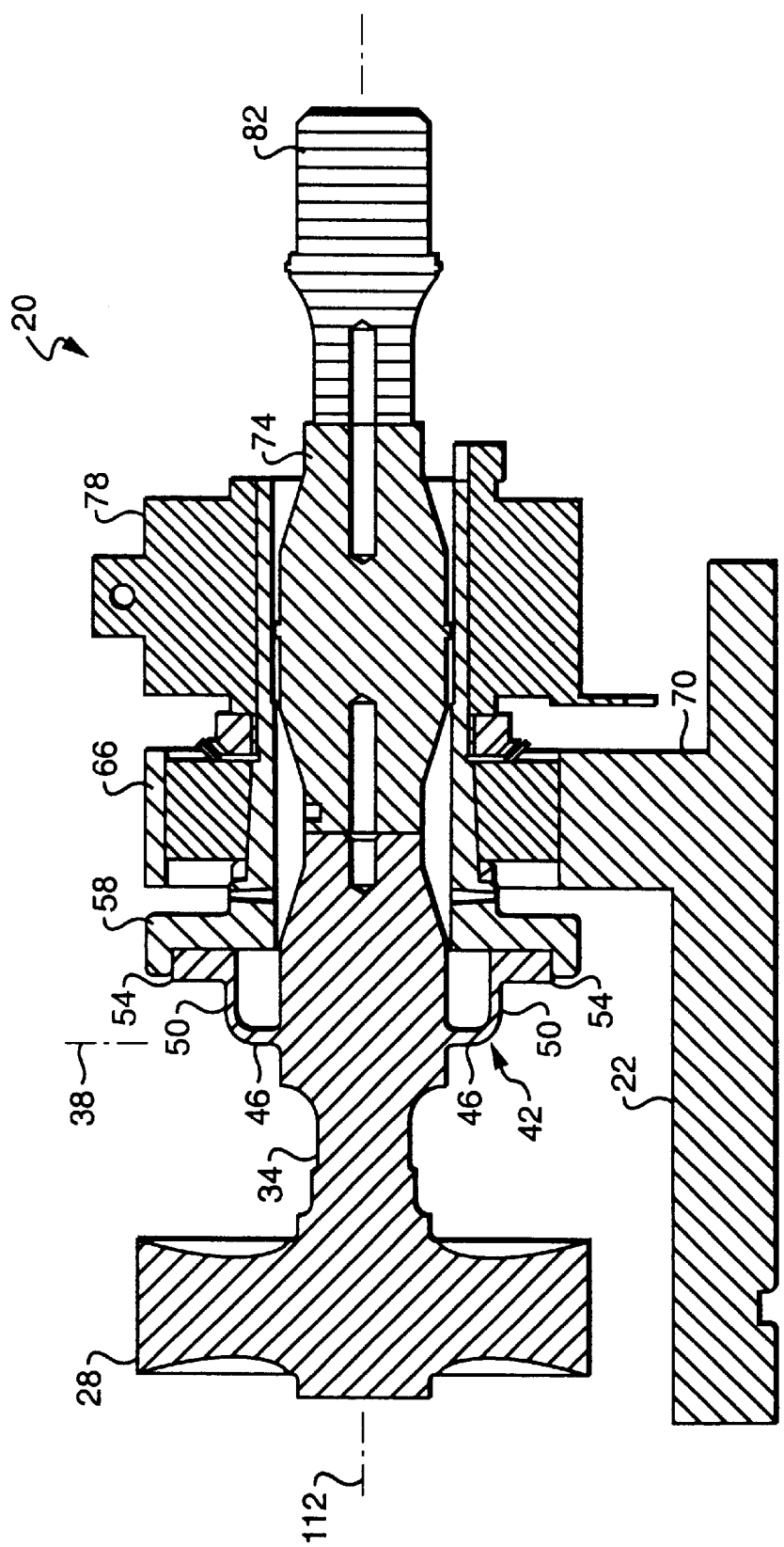
FIG. 8 shows a schematic view of a cross-section through the mounted horn member and isolation member illustrated in FIG. 7.

As representatively shown, the coupler 58 can be configured to provide a tube structure through which other components may be operably located and directed. With reference to FIGS. 4 and 8, for example, the axle member 34 can be co-linearly or coaxially arranged with respect to the coupler, and the axle member can extend through the coupler. Additionally, an ultrasonic booster member 74 can be co-linearly or coaxially arranged with respect to the coupler, and the booster member can extend through the coupler. The booster member can further be operatively connected to the axle member 34, and an ultrasonic exciter 82 can be operably connected to the booster member 74 by employing any conventional technique or device. For example, electrical power can be directed with suitable electrical conductors to a conventional slip ring 78 assembly, and the slip ring assembly can be employed to operatively direct the electrical power to the ultrasonic exciter 82. The exciter can use the electrical power to generate the desired ultrasonic energy, and direct the ultrasonic energy to the horn member 28. As representatively shown, the ultrasonic energy can be directed into the booster member 74, through the axle member 34 and into the horn member.

The method and apparatus can be suitably mounted on a support frame 22. The coupler member 58 can be substantially non-resiliently supported with a mounting system that is substantially non-elastomeric and has relatively high rigidity and stiffness. The mounting system can be substantially free of components constructed with an elastomer, such as natural or synthetic rubber. In a particular feature, the rotational bearing 66 can be substantially non-resiliently mounted, and the mounting system can be substantially free of elastomeric mounting elements, such as provided by elastomeric O-rings. The support frame is desirable constructed with a suitable vibration-dampening material. Various conventional dampening materials are well known in the art. For example, the frame may be constructed from iron, and the iron can have a dampening capacity of about 100–500.

A desired bonding pattern 96, or other selected processing mechanism, can be provided on the outer peripheral surface 90 of the rotary anvil member 86, or may be provided on the outer peripheral surface 88 of the rotary horn member 28, as desired. In the representatively shown configuration, the desired bonding pattern is provided on the outer surface circumferential 90 of the anvil member 86. The bonding pattern can be composed of a plurality of bonding elements 132 which are configured to project substantially radially away from the outer surface 90 of the anvil member 86, in a manner that is well known in the art. The bonding elements can be discontinuously or substantially continuously distributed in a regular or irregular array across the outer peripheral surface 90 of the anvil member 86, or the outer surface 88 of the horn member 28, as desired.

The method and apparatus can be substantially free of rotational supports that directly contact the rotary horn member 28. In particular, the method and apparatus can be substantially free of rotational supports that directly contact the outer peripheral surface 88 of the horn member 28.

In a further aspect, the method and apparatus can be substantially free of supports that directly contact the rotary anvil member 86 to maintain a selected position of the rotary anvil member relative to the rotary horn member. More particularly, the method and apparatus can be substantially free of rotational supports that directly contact the outer peripheral surface 90 of the anvil member 86.

In the various attachments and securements employed in the constructions of the method and apparatus of the invention, it should be readily apparent that any conventional attachment or securement technique may be employed. Such techniques may, for example, include adhesives, welds, screws, bolts, rivets, pins, latches, clamps or the like, as well as combinations thereof.

Similarly, it should be readily apparent that any conventional material may be employed to construct the various members and components of the method and apparatus. Such materials can include synthetic polymers, fiberglass-resin composites, carbon fiber-resin composites, metals, metallic composites, ceramic composites, and the like, as well as combinations thereof. For example, suitable metals may include steel, aluminum, titanium or the like, as well as combinations there of. The materials are typically selected to provide desired levels of strength, hardness, low vibrational damping, toughness, fatigue resistance, durability, ease of manufacture, and ease of maintenance.

The dimensions of the various components can depend upon the particular application of the method and apparatus, and can be determined by employing standard engineering techniques. For example, the dimensions of the components can be determined by ascertaining the desired peak operating load and by setting the stress limits to a selected safety factor (e.g. a safety factor of ten) to help assure adequate operating life and fatigue resistance.

The rotary horn member 28, the corresponding wave guide/axle members, the corresponding isolation members and other cooperating components can be constructed as a unitary assembly which is integrally formed from a single piece of material. The one-piece design can eliminate interfaces that can be sources for excessive wear and excessive heat generation. Such interfaces can also contribute to the build up of tolerance errors during machining. Such tolerance errors can make it difficult to maintain a desired level of concentricity at the working surface of the rotary horn. As a result, the various configurations of the method and apparatus can reduce cost, provide increased stiffness, can operate within smaller tolerance ranges and can provide more consistent performance during high speed production.

It should be readily appreciated that the various rotational components can be dynamically spin-balanced to reduce wear, reduce vibrations, better maintain desired positionings and further improve the performance of the desired bonding operation. Each of the components may be dynamically balanced individually or in an operative combination with other components, as desired.

Although various illustrative and representative configurations have been described in detail herein, it is to be appreciated that other variants, modifications and arrangements are possible. All of such variations, modifications and arrangements are to be considered as being within the scope of the present invention.

What is claimed is:

1. An ultrasonic processing apparatus, comprising:
   a rotatable, ultrasonic horn member;
   a rotatable axle member which is operatively joined to said horn member; and
   an isolation member which is operatively joined to said axle member, said isolation member capable of bending under a horn-life range of sonic frequencies to provide an operative component of motion along a radial direction and an operative component of motion along an axial direction;
   wherein
      said isolation member has a radial isolation component and an axial isolation component;
      said radial isolation component is operatively joined to said axle member, is configured to extend substantially radially from said axle member, and is configured to dynamically bend under said horn-life range of sonic frequencies; and
      said axial isolation component is operatively joined to an operative portion of said radial isolation component is configured to extend substantially axially from said radial isolation component, and is configured to dynamically bend under said horn-life range of sonic frequencies.

2. The apparatus as recited in claim 1, wherein said radial isolation component extends substantially continuously along a circumferential direction of said isolation member.

3. The apparatus as recited in claim 1 wherein said radial isolation component extends discontinuously along a circumferential direction of said isolation member.

4. The apparatus as recited in claim 1, wherein said radial isolation component is substantially disk-shaped.

5. The apparatus as recited in claim 1, wherein said axial isolation component is configured to provide an axial extension from said radial isolation component.

6. The apparatus as recited in claim 1, wherein said axial isolation component is configured to provide an axial extension from a radially outboard section of said radial isolation component.

7. The apparatus as recited in claim 6, wherein said axial isolation component is configured to provide a substantially continuous axial extension from said radial isolation component.

8. The apparatus as recited in claim 6, wherein said axial isolation component is configured to extend substantially continuously along a circumferential direction of said isolation member.

9. The apparatus as recited in claim 6, wherein said axial isolation component is configured to extend discontinuously along a circumferential direction of said isolation member.

10. The apparatus as recited in claim 6, wherein said axial isolation component is substantially cylinder-shaped.

11. The apparatus as recited in claim 1, further including a rotatable coupler which is supported by a rotational bearing; wherein said isolation member is operatively joined to said coupler.

12. The apparatus as recited in claim 11, wherein
    said coupler provides a coupler opening; and
    said axial isolation component is operatively positioned and secured in said coupler opening.

13. The apparatus as recited in claim 11, wherein said isolation member is joined to said coupler by including an interference, friction-fit.

14. The apparatus as recited in claim 11, wherein said coupler has a coupler opening;
    said axial isolation component includes an extending flange portion; and
    said flange portion is operatively positioned and secure in said coupler opening.

15. The apparatus as recited in claim 14, wherein said flange portion is operatively joined to said coupler opening by including an interference, friction-fit.

16. The apparatus as recited in claim 1, further including:
    a rotatable anvil member which is cooperatively positioned proximate said horn member; and
    an ultrasonic exciter which is operatively connected to said horn member.

17. The apparatus as recited in claim 1, wherein said radial isolation component has a length end thickness which allow said radial isolation component to operatively bend without excessive fatigue;

said axial isolation component has a length and thickness which allow said axial isolation component to operatively bend without excessive fatigue.

18. The apparatus as recited in claim 1, wherein said rotatable horn member has a maximum deflection of not more than about 0.076 mm under a force of 445 N.

19. An ultrasonic processing method, comprising:

a rotating of an ultrasonic horn member;

said horn member having been operatively joined to a rotatable axle member; and said axle member having been operatively joined to a isolation member, said isolation member capable of dynamically bending and flexing under a horn-life range of sonic frequencies to provide an operative component of motion along a radial direction of the isolation member and an operative component of motion along an axial direction of the isolation member;

wherein said isolation member has been configured with a radial isolation component and an axial isolation component;

said radial isolation component has been operatively joined to said axle member in a configuration that extends at least radially from said axle member, and configured to operatively bend when subjected to said horn-life range of sonic frequencies; and said axial isolation component has been joined to an operative portion of said radial isolation component with a configuration that extends at leas axially from an operative portion of said radial isolation component, and has been configured to operatively bend when subjected to said horn-life range of sonic frequencies.

20. The method as recited in claim 19, further including an operative coupling of said isolation member to a rotational bearing.

21. The method as recited in claim 19, further including:

a cooperative positioning of a rotatable anvil member proximate to said horn member; and an operative joining of an ultrasonic exciter to said horn member.

22. An ultrasonic processing method, comprising:

a rotating of an ultrasonic horn member which has a first axial side and a second axial side;

said first axial side of said horn member having been operatively joined to a rotatable axle member;

said axle member having been operatively joined to a isolation member, said isolation member having a radial isolation component and a axial isolation component; wherein said radial isolation component has been joined to said axle member, has been configured to extend at least radially from said axle member, has a substantially annular-shape, and has been configured to dynamically bend under a horn-life range of sonic frequencies;

said axial isolation component has been joined to an operative portion of said radial isolation component, has been configured to extend axially from said radial isolation component, has a substantially cylinder-shape, and has been configured to dynamically bend under said horn-life range of sonic frequencies;

said isolation member having been operatively joined to a rotatable coupler which is supported by a rotational bearing;

said rotational bearing having been supported by a mount;

said mount having been axially spaced from a side of said horn member;

a rotatable anvil member having been cooperatively positioned at a selected spaced distance from said horn member;

said anvil member having been rotated by an anvil drive to provide an anvil, peripheral speed of at least about 5 m/min;

said horn member having been rotated by a horn drive to provide a horn, peripheral speed which substantially equals said anvil peripheral speed;

said horn member having been operatively connected to an ultrasonic exciter which can provide an operative amount of ultrasonic energy at a frequency within the range of about 15–60 KHz; and said horn member has been configured to exhibit a static deflection of not more than about 0.076 mm under a force of 445 N.

* * * * *